US011982955B2

(12) United States Patent
Park et al.

(10) Patent No.: US 11,982,955 B2
(45) Date of Patent: May 14, 2024

(54) PREVENTION OF FIRE BY ABSORBING LOCAL LATENT HEAT OF FIXING BELT

(71) Applicant: HEWLETT-PACKARD DEVELOPMENT COMPANY, L.P., Spring, TX (US)

(72) Inventors: Sun Ae Park, Seongnam-si (KR); Bong Hee Lee, Seongnam-si (KR); Jung Jae Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/790,210

(22) PCT Filed: Jan. 5, 2021

(86) PCT No.: PCT/US2021/012190
§ 371 (c)(1),
(2) Date: Jun. 30, 2022

(87) PCT Pub. No.: WO2021/146079
PCT Pub. Date: Jul. 22, 2021

(65) Prior Publication Data

US 2023/0040825 A1 Feb. 9, 2023

(30) Foreign Application Priority Data

Jan. 13, 2020 (KR) ........................ 10-2020-0004040

(51) Int. Cl.
*G03G 15/20* (2006.01)

(52) U.S. Cl.
CPC ..... *G03G 15/2017* (2013.01); *G03G 15/2053* (2013.01)

(58) Field of Classification Search
CPC ............. G03G 15/205; G03G 15/2017; G03G 15/2039; G03G 15/2053
See application file for complete search history.

(56) References Cited

U.S. PATENT DOCUMENTS

| | | | |
|---|---|---|---|
| 7,283,757 B2 | 10/2007 | Fujimoto et al. | |
| 2009/0060549 A1 | 3/2009 | Ahn | |
| 2009/0245835 A1 | 10/2009 | Campbell et al. | |
| 2013/0089350 A1 | 4/2013 | Mukai | |
| 2014/0341627 A1* | 11/2014 | Yoshikawa ........ | G03G 15/2053 399/329 |
| 2017/0192379 A1 | 7/2017 | Cao et al. | |

FOREIGN PATENT DOCUMENTS

| | | |
|---|---|---|
| JP | 2011-027771 A | 2/2011 |
| JP | 2013-250535 A | 12/2013 |
| JP | 2015-215507 A | 12/2015 |

* cited by examiner

*Primary Examiner* — Thomas S Giampaolo, II
(74) *Attorney, Agent, or Firm* — Foley & Lardner LLP

(57) ABSTRACT

A device to prevent fire of a fusing belt having a heater positioned inside includes at least one temperature control member adjacent to one side of the fusing belt and, when the at least one temperature control member detects abnormal heat from the fusing belt based on a temperature of the fusing belt, the at least one temperature control member to cut off a supply of electricity to the heater to prevent the fire. The device also includes a heat absorption member adjacent to the other side of the fusing belt and to absorb latent heat from the fusing belt to lower the temperature of the fusing belt to prevent the fire.

14 Claims, 6 Drawing Sheets

PREVENTION OF FIRE BY ABSORBING LOCAL LATENT HEAT OF FIXING BELT

BACKGROUND

In general, an image forming apparatus such as a copier, a printer apparatus, or a facsimile apparatus using an electrophotographic method includes a fuser for fusing an unfused toner transferred to a printing medium to the printing medium by heating and pressing.

As the printing medium passes through a fixing nip (i.e., fusing nip) formed between a fusing belt (or fixing belt) of the fuser and a pressing roller pressed when brought into contact with the fusing belt, an unfused image is heated, pressed, and stably fused on the printing medium.

DETAILED DESCRIPTION

Hereinafter, various examples will be described with reference to the drawings. The examples described hereinafter may, however, be embodied in many different forms. In the following description, well-known functions or constructions are not described in detail for clarity of description when it is determined that they are well known to those of ordinary skilled in the art.

It will be understood that when an element is referred to as being "connected to" or "coupled to" another element, the element may be "directly connected or coupled" to the other element, or "indirectly connected or coupled" to the other element, such as being "electrically connected to" the other element, with intervening elements therebetween. The terms "comprises," "comprising," "includes," and/or "including" when used herein, specify the presence of components, but do not preclude the presence or addition of one or more other components, unless otherwise specified.

In this disclosure, an "image forming job" may refer to various jobs related to an image (e.g., printing, scanning, or faxing) including forming of an image or creation/storage/transmission of an image file. A "job" may refer to not only an image forming job, but also include a series of processes of performing an image forming job.

In addition, an "image forming apparatus" refers to an apparatus for printing print data generated by a terminal device such as a computer on a printing medium. Examples of such an image forming apparatus include a copier, a printer, a facsimile, or a multi-function printer (MFP) that implements functions of aforementioned devices in a single device.

Figure 1:
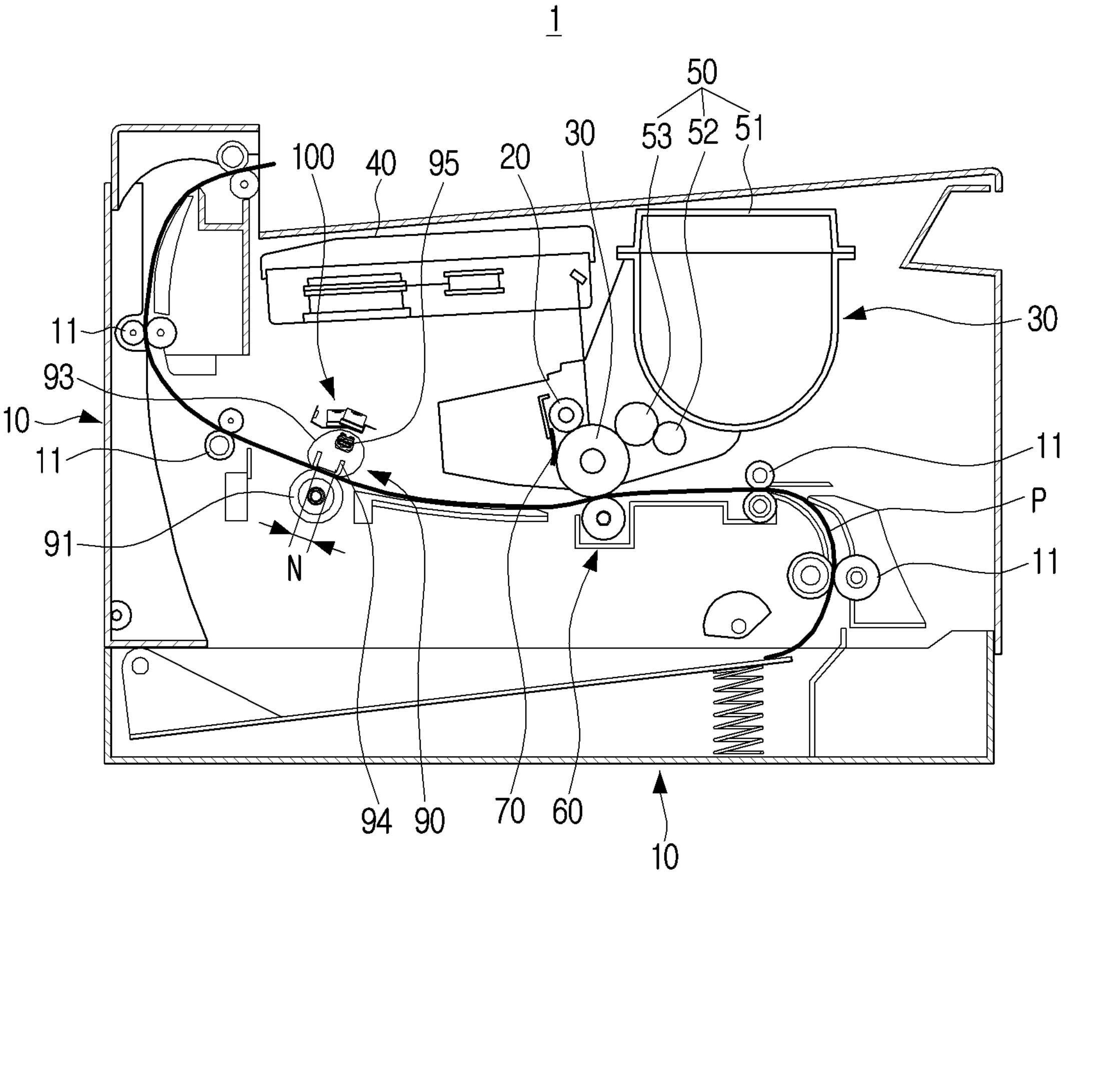
FIG. 1 is a schematic diagram illustrating an image forming apparatus equipped with a device for preventing fire of a fusing belt according to an example.

FIG. 1 is a schematic view illustrating an image forming apparatus equipped with a device for preventing fire of a fusing belt according to an example.

In FIG. 1, the thick solid line indicated by reference numeral P represents a traveling path of a printing medium. In FIG. 1, a main body (no reference numeral) of the image forming apparatus 1 may be a portion forming an external appearance of the image forming apparatus 1.

A paper feeding device 10 may store the printing medium such as paper. The printing medium is conveyed along the traveling path P by a plurality of conveying rollers 11. A charging device 20 may charge a photosensitive body 30 with a predetermined potential. An optical scanning device 40 may scan light to the photosensitive body 30 to form an electrostatic latent image corresponding to print data on the photosensitive body 30. The charging device 20, the photosensitive body 30, and the optical scanning device 40 may configure a print engine for forming an image on the printing medium.

An example of a print engine is now described. A developing device 50 may supply toner to the photosensitive body 30 with the electrostatic latent image formed thereon to form a toner image. The developing device 50 may include a toner accommodating part 51, a toner supply roller 52, and a developing roller 53.

The toner accommodating part 51 accommodates the toner therein. The toner supply roller 52 supplies the toner accommodated in the toner accommodating part 51 to the developing roller 53, and accordingly, a toner layer is formed on the developing roller 53. A regulating blade (not shown) makes such a toner layer uniform. The toner layer on the developing roller 53 moves to the electrostatic latent image formed on the photosensitive body 30 due to a potential difference to develop the toner image.

A transfer device 60 may transfer the toner image formed on the photosensitive body 30 to the printing medium. A cleaning device 70 may remove the toner remaining in the photosensitive body 30 after the transfer process is performed.

A fuser 90 may fuse to the printing medium the toner image transferred to the printing medium. The printing medium on which the toner image is fused is discharged out of the image forming apparatus 1 by the plurality of conveying rollers 11, thereby completing the printing process.

The fuser 90 may include a pressing roller 91 and a fusing belt 93. In a section where the pressing roller 91 and the fusing belt 93 are in contact with each other, a fixing nip N is formed to extend in a length direction of traveling path P. The fixing nip N is formed to be equal to or larger than a width of the printing medium. An unfused toner, which forms a toner image, is present on the printing medium passing through the transfer device 60. As heat and pressure are applied to the printing medium while the printing medium passes through the fixing nip N, the unfused toner may be fused.

The pressing roller 91 may be formed of an elastic material such as, for example, rubber or sponge. The pressing roller 91 may apply pressure to the printing medium passing through the fixing nip N. For example, the pressing roller 91 may be pressed toward the fusing belt 93 by an elastic member (not shown).

A heater 95 is disposed inside the fusing belt 93. The heater 95 may heat a nip forming frame 94 to heat the printing medium passing through the fixing nip N. The nip forming frame 94 may be disposed to be in contact with an inner side of the fusing belt 93. The heater 95 may be disposed symmetrically with respect to a center of the fusing belt 93 (see FIG. 2).

The fusing belt 93 may be formed of a material having flexibility and may have a width equal to or larger than that of the printing medium. The fusing belt 93 may span the nip forming frame 94 with no tension to form a closed loop.

The fusing belt 93 may be rotated by a frictional force generated between the pressing roller 91 and the fusing belt 93 as the pressing roller 91 rotates. Accordingly, the printing medium passing through the transfer device 60 may pass through the fixing nip N.

The fusing belt 93 is a cylindrical endless belt and may be formed, for example, mainly of a resin film or a metal sleeve. Although not shown in the drawing, the fusing belt 93 may include a base layer and a release layer sheathing one surface of the base layer adjacent to the pressing roller 91 or opposing surfaces of the base layer. To improve image quality of printed matter, an elastic layer may be disposed between the base layer and the release layer to form a relatively wide and flat fixing nip N.

The base layer of the fusing belt 93 is formed of a heat resistant resin such as polyimide, polyamide, polyimideamide, or a metal such as SUS (Steel Use Stainless), nickel, copper, or the like and may have a thickness of 30 to 200 μm. An appropriate thickness of the base layer may be 50 to 100 μm.

The release layer of the fusing belt 93 may be formed, for example, of a fluorine-based resin such as perfluoroalkoxy (PFA), polytetrafluoroethylene (PTFE), a copolymer of tetrafluoroethylene and hexafluoroethylene (fluorinated ethylene propylene (FEP)), and an appropriate thickness thereof is about 10 to 30 μm. As a material for the release layer, fluorine-based resins are mainly used, and the thickness is, for example, 10 to 50 μm. As the fluorine-based resin, perfluoroalkyl, polytetrafluoroethylene, a copolymer of tetrafluoroethylene and hexafluoroethylene, and the like, for example, may be used. As the release layer, a tube formed of a fluorine resin may be used, for example, and the release layer may be formed by a coating method using the fluorine resin.

As the elastic layer of the fusing belt 93, fluorine rubber, silicone rubber, or the like, for example, may be used. In the elastic layer, an insulating elastic layer may include various rubber materials such as, for example, fluorine rubber, silicone rubber, natural rubber, isoprene rubber, butadiene rubber, nitrile rubber, chloroprene rubber, butyl rubber, acrylic rubber, hydrin rubber, urethane rubber, and various elastic material such as, for example, thermoplastic elastomer such as styrenes, polyolefins, polyvinyl chlorides, polyurethanes, polyesters, polyamides, polybutadienes, toransporisoprenes, chlorinated polyethylenes, and the like, and may include one or two or more kinds thereof.

The fuser 90 provided in the image forming apparatus of the disclosure uses heat to melt the toner and fuses toner to paper, in which case the heat is generated from the heater 95. By making the fusing belt 93 thinner and increasing the efficiency of the heater 95, the printing speed is increased and the print time of a first sheet is shortened.

As the efficiency of the heater 95 increases with the reduction in the thickness of the fusing belt 93 described above, a time for the fusing belt 93 to catch fire due to abnormal overheating is gradually shortened and the fusing belt 93 would catch fire more quickly. To prevent such fire, the image forming apparatus 1 of the disclosure includes a device 100 for preventing fire of the fusing belt at a position adjacent to the fusing belt 93. The device 100 for preventing fire of the fusing belt is to detect whether the fusing belt has reached a temperature at which the fusing belt may ignite a fire to cut off power supplied to the heater 95 to turn off the heater 95, and absorb latent heat generated locally at the fusing belt 93, thereby fundamentally preventing firing due to the latent heat.

Hereinafter, an example of a configuration of the device 100 for preventing fire of a fusing belt according to the disclosure will be described in detail with reference to the drawings.

Figure 2:
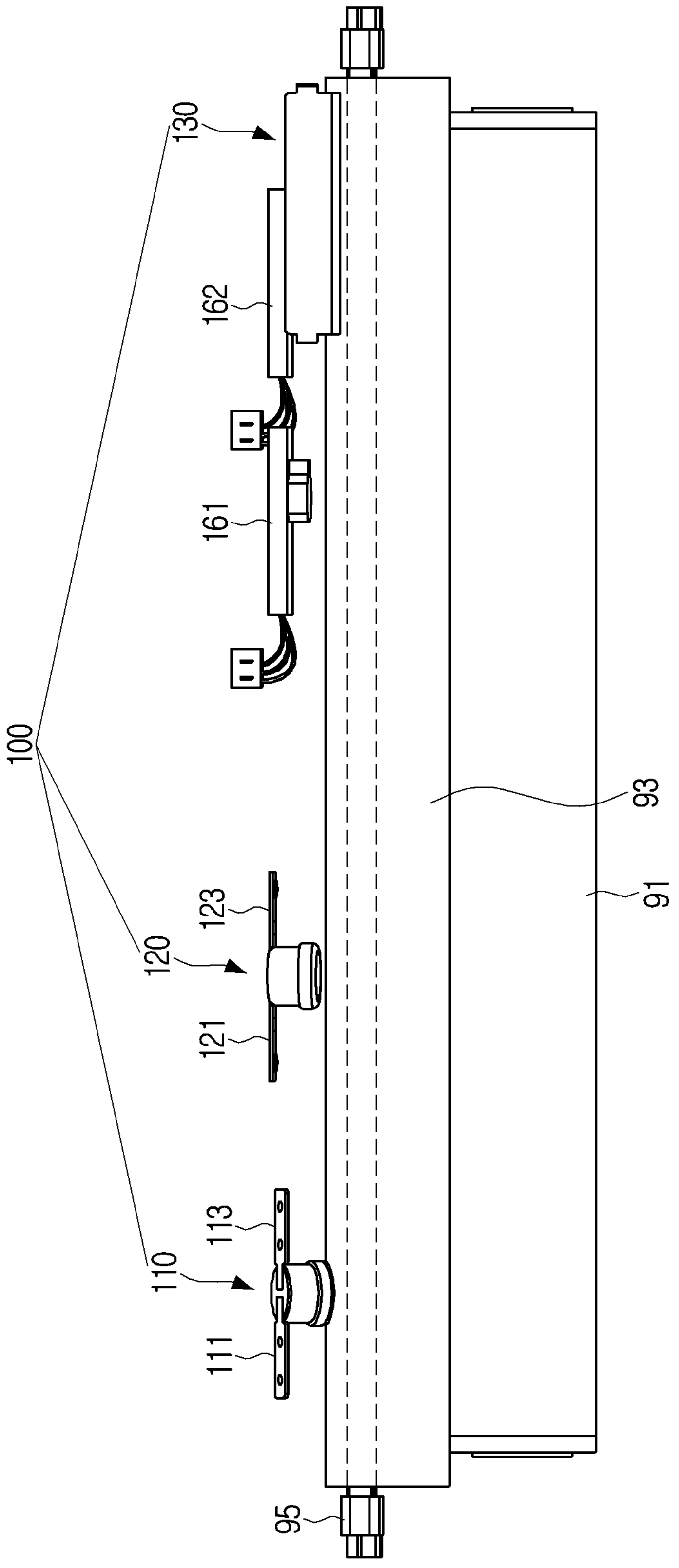
FIG. 2 is a front view illustrating a device for preventing fire of a fusing belt according to an example.
Figure 3:
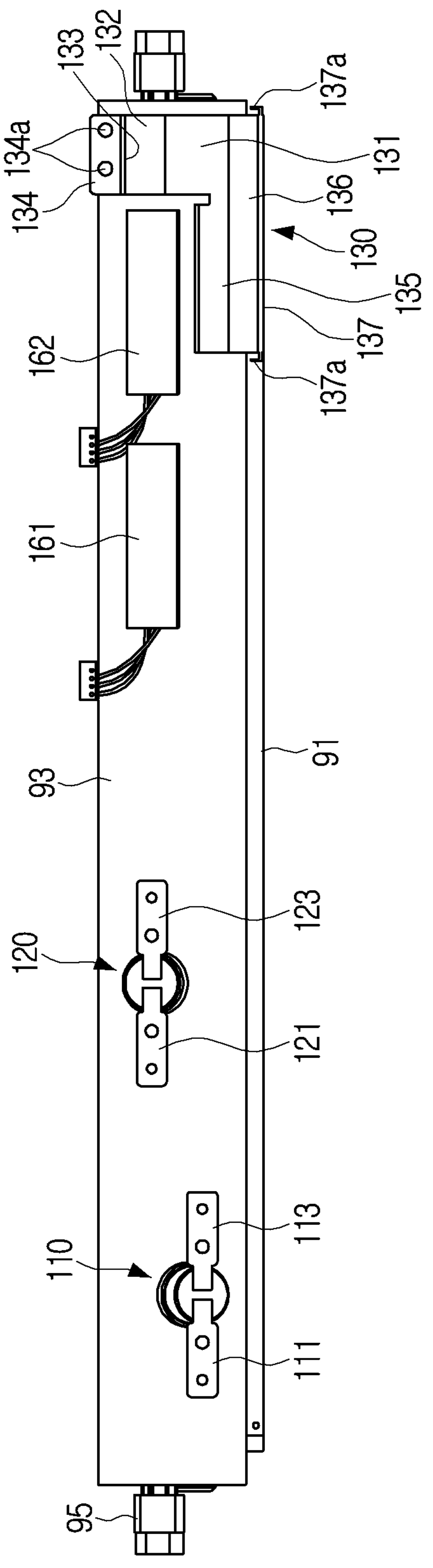
FIG. 3 is a plan view illustrating a device for preventing fire of a fusing belt according to an example.
Figure 4:
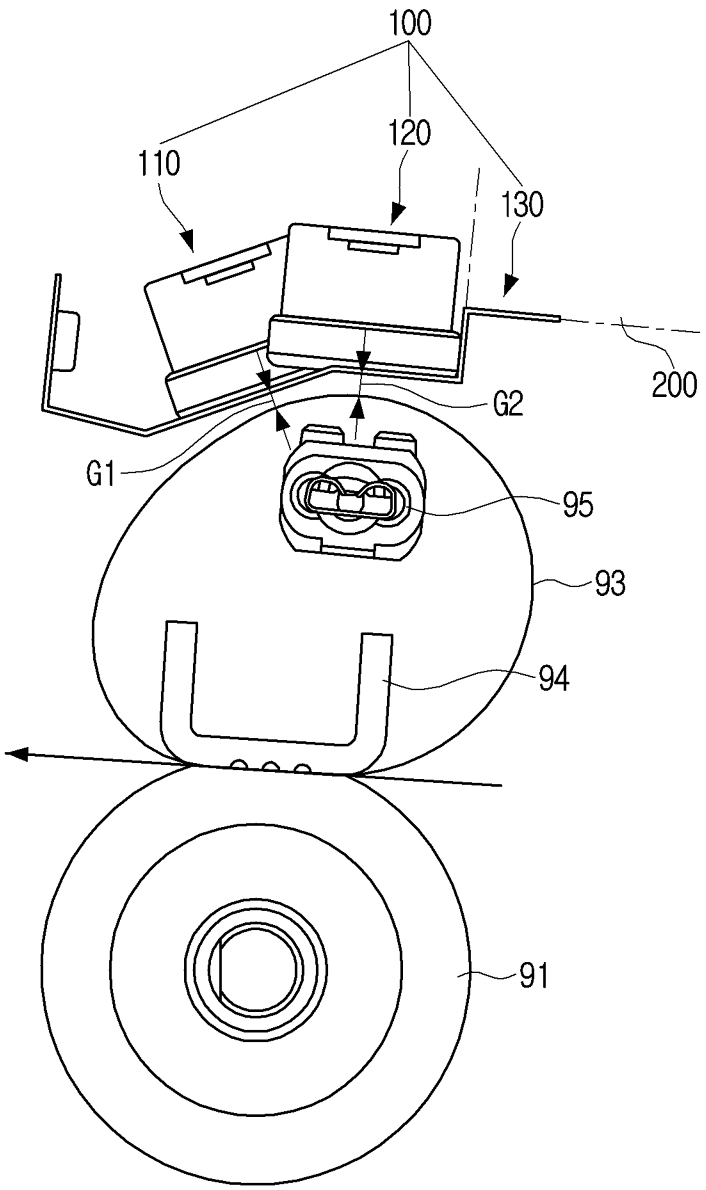
FIG. 4 is a left side view illustrating a device for preventing fire of a fusing belt according to an example.
Figure 5:
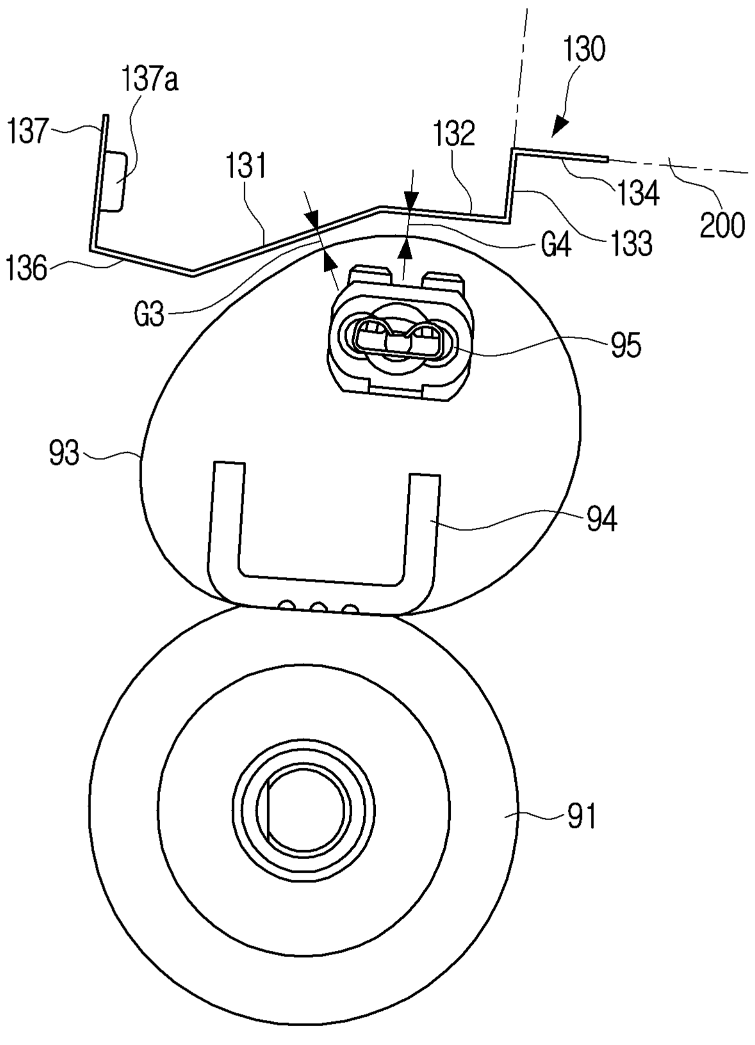
FIG. 5 is a left side view illustrating an example of a device for preventing fire of a fusing belt in a state where a temperature control device is omitted in FIG. 4.

FIGS. 2 to 4 are a front view, a plan view, and a left side view, respectively, showing a device 100 for preventing fire of a fusing belt according to an example. FIG. 5 is a left side view showing a device for preventing fire of a fusing belt in in an example in which temperature control members 110 and 120 shown in FIG. 4 are omitted.

Referring to FIGS. 2 to 4, the device 100 for preventing fire of the fusing belt includes first and second temperature control members 110 and 120 disposed adjacent to one side of the fusing belt 93, a heat absorption member 130 disposed adjacent to the other side of the fusing belt 93, and first and second temperature sensors 161 and 162 for detecting a temperature of the fusing belt 93.

In this disclosure, the first and second temperature control members 110 and 120 and the first and second temperature sensors 161 and 162 are provided as pairs, respectively, but the disclosure is not limited thereto and at least one of each of the temperature control members and temperature sensors may be provided. In addition, in this disclosure, one heat absorption member 130 is provided, but the disclosure is not limited thereto and the heat absorption member 130 may be manufactured in a smaller size and two or more heat absorption members 130 may be provided.

The first and second temperature control members 110 and 120 may be thermostats. When a temperature of the fusing belt 93 rises above a predetermined temperature due to, for example, abnormal heat generated in the heater 95, the first and second temperature control members 110 and 120 may cut off supply of electricity to the heater 95 to prevent the heater 95 from generating more heat. The first and second temperature control members 110 and 120 may include a bimetal, for example, and therefore permanently cut off supply of electricity to the heater 95 when a temperature of the bimetal is higher than or equal to a threshold value.

The fusing belt 93 may locally swell due to occurrence of abnormal heat of the heater 95. In this case, the fusing belt 93 may ignite, or otherwise react, due to the abnormal heat in a time shorter than a time in which the fusing belt 93 may ignite, or otherwise react, due to radiant heat and convective heat. The first and second temperature control members 110 and 120 may be spaced apart from each other so as not to come into contact with the fusing belt 93 due to movement of the fusing belt 93 that may take place during a normal operation of the fusing belt 93. In this case, the first and second temperature control members 110 and 120 may be arranged to maintain first and second gaps G1 and G2 from an outer surface of the fusing belt 93, respectively.

According to the arrangement of the first and second temperature control members 110 and 120 with respect to the fusing belt 93, when one side of the fusing belt 93 is swollen by local heat and brought into contact with at least one of the first and second temperature control members 110 and 120, for example in the case of abnormal heat generation of the heater 95, the bimetals of the first and second temperature control members 110 and 120 may open due to conductive heat and react more quickly to quickly cut off supply of electricity to the heater 95 than the first and second temperature control members 110 and 120 would react to radiant heat and convective heat.

As such, a portion of the entire area of the fusing belt 93 swollen by abnormal heat generation of the heater 95 may vary according to a position of the heater 95 inside the fusing belt 93. That is, referring to FIG. 4, the nip forming frame 94 is disposed at a position adjacent to the pressing roller 91 inside the fusing belt 93. In this case, the heater 95 is disposed at a position away from the pressing roller 91 so as not to interfere with the nip forming frame 94. Therefore, in this disclosure, the first and second temperature control members 110 and 120 may be disposed adjacent to an upper side of the fusing belt 93 closest to the heater 95 positioned inside the fusing belt 93. As such, the first and second temperature control members 110 and 120 are disposed, for example, in consideration of the position of the heater 95.

The first temperature control member 110 has a positive (+) terminal 111 and a negative (−) terminal 113 to which a wire (not shown) is connected, and the second temperature control member 120 also has a positive (+) terminal 121 and a negative (−) terminal 123. Each of the terminals 111, 113, 121, and 123 of the first and second temperature control members 110 and 120 may be connected to wires and supported by a structure (not shown) disposed near the fusing belt. Due to the structure, the first and second temperature control members 110 and 120 may be arranged to maintain desired gaps, e.g., first and second gaps G1 and G2, from the outer surface of the fusing belt 93.

Meanwhile, even when the heater 95 is turned off as the supply of electricity to the heater 95 is cut off by the first and second temperature control members 110 and 120, local latent heat may occur on the other side of the fusing belt 93, i.e., on the other side of the fusing belt where the first and second temperature sensors 161 and 162 are arranged. The fusing belt 93 may burn out due to local latent heat. The heat absorption member 130 may absorb the local latent heat of the fusing belt 93 and disperse the absorbed local latent heat around the fusing belt 93 to lower a temperature of the fusing belt 93, thereby eliminating a fire factor.

The heat absorption member 130 may be formed of, for example, a metal material (e.g., aluminum, copper, etc.) having excellent thermal conductivity. To reduce a manufacturing cost of the heat absorption member 130, the heat absorption member 130 may be manufactured with relatively inexpensive aluminum.

Referring to FIGS. 3 and 5, the heat absorption member 130 may be disposed on the other side of the fusing belt 93 and maintain a predetermined gap from the outer surface of the fusing belt 93. The heat absorption member 130 may be formed by bending a flat plate in multiple stages to surround a portion of the fusing belt 93 along a width direction (which refers to a direction perpendicular to a length direction of the fusing belt 93) of the fusing belt 93.

A region where the heat absorption member 130 is disposed may vary depending on a position of the heater 95 inside the fusing belt 93, similarly to the positions of the first and second temperature control members 110 and 120 described above. That is, referring to FIG. 5, the heater 95 is disposed at a position away from the pressing roller 91 to avoid interfering with the nip forming frame 94. Therefore, in this disclosure, the heat absorption member 130 may be disposed above the fusing belt 93 closest to the heater 95 positioned inside the fusing belt 93. As such, the heat absorption member 130 may be disposed in consideration of the position of the heater 95.

The heat absorption member 130 may include a first heat absorption part 131 and a second heat absorption part 132 which are brought into contact with a swollen portion of the fusing belt 93 due to local latent heat. The first heat absorption part 131 may be disposed with a third gap G3 with respect to the outer surface of the fusing belt 93, and the second heat absorption part 132 may be disposed with a fourth gap G4 with respect to the outer surface of the fusing belt 93.

As the second heat absorption part 132 extends to one side of the first heat absorption part 131 and is bent at a predetermined angle with respect to the first heat absorption part 131, the second heat absorption part 132 may be positioned at a downstream portion with respect to the first heat absorption part 131 with reference to the width direction of the fusing belt 93. The first and second heat absorption parts 131 and 132 may come into contact with the fusing belt 93 that swells at different points along the width direction of the fusing belt 93.

The third and fourth gaps G3 and G4 are distances at which the first and second heat absorption parts 131 and 132 are spaced apart from the fusing belt 93 and not to be in contact with the fusing belt 93 due to movement of the fusing belt 93 that takes place during a normal operation of the fusing belt 93, which also counts a distance at which a swollen portion of the fusing belt 93 due to abnormal heat generation of the heater 95 comes into contact with the first and second heat absorption parts 131 and 132. The first and second heat absorption parts 131 and 132 may absorb local latent heat of the fusing belt 93 through conduction and lower a temperature of the fusing belt 93, thereby fundamentally preventing fire of the fusing belt 93 due to latent heat.

In this disclosure, the heat absorption part is described as two bent parts, but the disclosure is not limited thereto and the heat absorption part may have one or at least three parts. If the heat absorption part has at least three parts, the heat absorption part may be bent in multiple stages at regular intervals along a profile of the fusing belt 93.

The heat absorption member 130 includes a fixed part 134 extending indirectly from the second heat absorption part 132 through a connection part 133. The fixed part 134 is fixed to a peripheral structure 200 through a fastening screw (not shown) so that the heat absorption member 130 may be disposed adjacent to the fusing belt 93. The fixed part 134 may have a through hole 134*a* (see FIG. 3) through which the fastening screw passes.

The heat absorption member 130 may further include first to third additional heat absorption parts 135, 136, and 137 to increase a heat absorption area. The first to third additional heat absorption parts 135, 136, and 137 serve to increase the heat absorption area and absorb heat from the fusing belt 93 when a swollen portion of the fusing belt 93 due to abnormal heat generation of the heater 95 comes into contact therewith. Accordingly, the heat absorption member 130 may extend a heat absorption point with respect to the fusing belt 93 through the first to third additional heat absorption parts 135, 136, and 137.

The first to third additional heat absorption parts 135, 136, and 137 may be arranged not to interfere with a structure or component installed around the heat absorption member 130, e.g., the first and second temperature sensors 161 and 162. To this end, the first to third additional heat absorption parts 135, 136, and 137 may extend with a predetermined length toward one side of the fusing belt 93 along the length direction of the fusing belt 93 from the other side of the first heat absorption part 131 as shown in FIG. 3.

The first to third additional heat absorption parts 135, 136, and 137 may be arranged at right angles with respect to the first and second heat absorption parts 131 and 132. However, a direction in which the first to third additional heat absorption parts 135, 136, and 137 extend may face in various directions in consideration of a peripheral structure of the heat absorption member 130 or a component to be installed.

The first additional heat absorption part 135 may be coplanar with the first heat absorption part 131. The second and third additional heat absorption parts 136 and 137 may be bent in multiple stages along the width direction of the fusing belt 93 from the first additional heat absorption part 135. The second and third additional heat absorption parts 136 and 137 may be bent at an appropriate angle so as not to interfere with a peripheral structure of the heat absorption member 130 or the like.

The third additional heat absorption part 137 may have fixed pieces 137*a*, which may be inserted and fixed to a peripheral structure or the like, extending from both sides thereof to firmly fix the heat absorption member 130. In this case, the fixed pieces 137*a* need not be a pair and at least one fixed piece 137*a* may be provided. In addition, a shape of the fixed piece 137*a* is not limited to a specific shape and may be formed in consideration of various shapes of a peripheral structure.

Meanwhile, in this disclosure, the heat absorption member 130 further includes the first to third additional heat absorption parts 135, 136, and 137, but the number of the additional heat absorption parts is not limited thereto and the heat absorption member 130 may have at least four multi-bent shape. In this manner, as the number of additional heat absorption parts increases, the heat absorption area of the heat absorption member 130 may be increased.

In addition, the heat absorption member 130 has a simple structure to be easily manufactured, and may be easily installed not to interfere with a peripheral structure when installed near the fusing belt 93. The heat absorption member 130 may be manufactured with aluminum which is low in price among metals having high thermal conductivity to lower a manufacturing cost.

The first and second temperature sensors 161 and 162 may be thermistors and may be disposed on the other side of the fusing belt 93. Each of the temperature sensors 161 and 162 may be disposed to maintain a predetermined gap with the fusing belt 93 not to interfere with rotational driving of the fusing belt 93.

In this disclosure, heat of a portion of the fusing belt 93 where preceding fire occurs is absorbed through the heat absorption member 130 configured as described above at a portion where the temperature is locally highest due to a heating pattern of the heater 95, thereby preventing fire in advance, as well as delaying a fire start time.

The first temperature sensor 161 may measure a temperature of the fusing belt 93 at a position different from the second temperature sensor 162 in the length direction of the fusing belt 93. For example, the first temperature sensor 161 may be installed to be positioned closer to a central portion of the fusing belt 93 than the second temperature sensor 162 in the length direction of the fusing belt 93.

In addition, when the first temperature sensor 161 is disposed at a first position in the width direction of the fusing belt 93, the second temperature sensor 162 may be disposed at a second position which is a downstream side with respect to the first temperature sensor 161 to measure temperatures at different points of the fusing belt 93.

As described above, in this disclosure, whether the fusing belt 93 is overheated may be reliably determined by utilizing temperatures measured at different positions with respect to the fusing belt 93 through the respective temperature sensors 161 and 162.

The first and second temperature sensors 161 and 162 may indirectly measure a temperature of the heater 95 by measuring a temperature of the fusing belt 93. The first and second temperature sensors 161 and 162 may transmit the measured temperatures to a controller (not shown) and the controller may control a driving state of the image forming apparatus 1. For example, when the temperatures measured by the first and second temperature sensors 161 and 162 are higher than a reference value of the temperature of the heater 95, the controller turns off the heater 95 to control the image forming apparatus 1 to cool the fusing belt 93 while being idly rotated.

Figure 6:
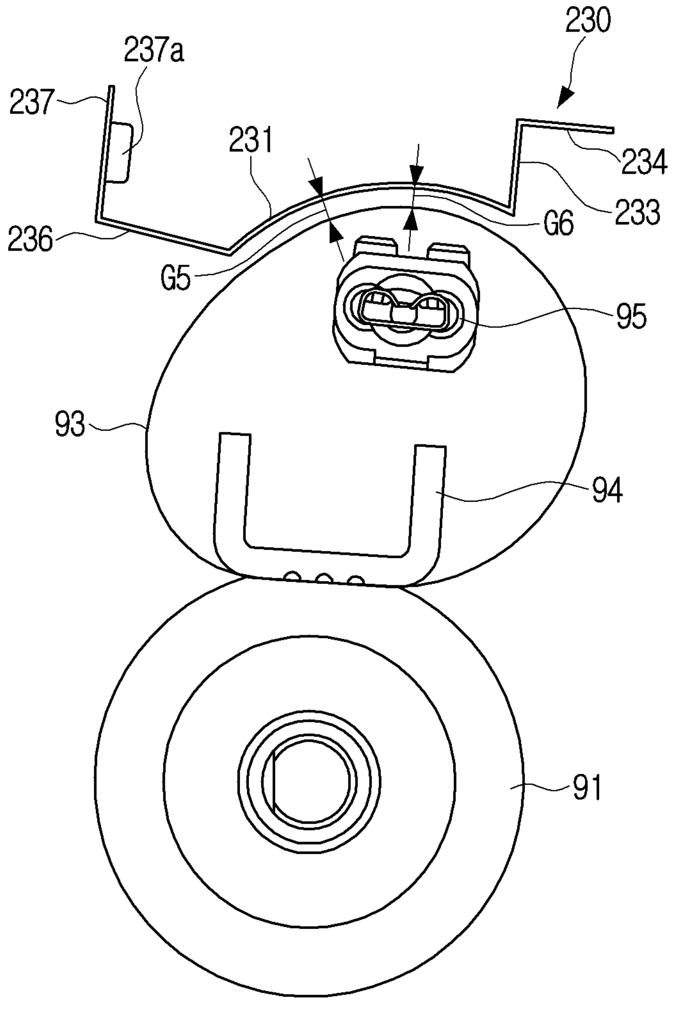
FIG. 6 is a side view illustrating another example of a heat absorption member of a device for preventing fire of a fusing belt according to an example.

FIG. 6 is a side view illustrating another example of a heat absorption member of a device of preventing fire of the fusing belt according to an example.

The heat absorption member 130 described above is formed to be bent in multiple stages to surround the portion of the fusing belt 93. However, a heat absorption member 230 is not limited to such a shape and may be provided such that a portion thereof surrounding the fusing belt 93 corresponds to a profile of the fusing belt 93.

A heat absorption part 231 of the heat absorption member 230 may be provided as a curved surface to correspond to a profile of the fusing belt 93 configured as a curved surface. The heat absorption part 231 may be disposed with a fifth gap G5 and a sixth gap G6 with respect to two points of an outer surface of the fusing belt 93, similar to the first and second heat absorption parts 131 and 132 described above. Accordingly, the heat absorption part 231 may come into contact with the fusing belt 93 swollen at different points along the width direction of the fusing belt 93.

The fifth and sixth gaps G5 and G6 are distances at which the heat absorption part 231 is spaced apart from the fusing belt 93 and not to be in contact with the fusing belt 93 due to movement of the fusing belt 93 that takes place during a normal operation of the fusing belt 93, which also counts a distance at which a swollen portion of the fusing belt 93 due to abnormal heat generation of the heater 95 comes into contact with the heat absorption part 231. The heat absorption part 231 may absorb local latent heat of the fusing belt 93 through conduction and lower a temperature of the fusing belt 93, thereby fundamentally preventing fire of the fusing belt 93 due to latent heat.

The heat absorption member 230 may include an extending part 233 and a fixed part 234 extending from one side of the heat absorption part 231. The fixed part 234 may be fixed to a peripheral structure through a fastening screw. The extending part 233 and the fixed part 234 may be bent in multiple stages and a connection part connecting the extending part 233 and the fixed part 234 may be formed in a curve having a predetermined curvature.

The heat absorption member 230 may further include first to third additional heat absorption parts 235 (not shown), 236, and 237 to increase a heat absorption area. The first to third additional heat absorption parts 235, 236, and 237 may have the same configuration as that of the first to third additional heat absorption parts 135, 136, and 137 of the heat absorption member 130.

That is, the first additional heat absorption part 235 may be coplanar with the heat absorption part 231. The second and third additional heat absorption parts 236 and 237 may be bent in multiple stages along the width direction of the fusing belt 93 from the first additional heat absorbing part 235. The second and third additional heat absorption parts 236 and 237 may be bent at an appropriate angle so as not to interfere with a peripheral structure of the heat absorption member 230. The third additional heat absorption part 237 may have fixed pieces 237*a*, which may be inserted and fixed to a peripheral structure or the like, extending from both sides thereof to firmly fix the heat absorption member 230.

As above, the present invention has been illustrated and described with respect to preferred examples of the present invention, but the present invention is not limited to the above-described examples and various modifications may be made by a person skilled in the art to which the present invention pertains, without departing from the spirit of the invention as defined by the claims of the present invention, and such modifications also fall within the claims.

What is claimed is:

1. A device to prevent fire of a fusing belt having a heater positioned inside, the device comprising:

at least one temperature control member adjacent to one side of the fusing belt and, when the at least one temperature control member detects abnormal heat from the fusing belt based on a temperature of the fusing belt, the at least one temperature control member to cut off a supply of electricity to the heater to prevent the fire; and a heat absorption member to absorb latent heat from the fusing belt to lower the temperature of the fusing belt to prevent the fire, wherein the at least one temperature control member and the heat absorption member are at the same interval with respect to an outer surface of the fusing belt, wherein the heat absorption member is located entirely on an opposite side of the temperature control member with respect to a center of the fusing belt in an axial direction of the fusing belt.

2. The device as claimed in claim 1, wherein the heat absorption member has a plate-like shape surrounding a portion of the other side of the fusing belt.

3. The device as claimed in claim 2, wherein the heat absorption member maintains a predetermined gap from an outer surface of the other side of the fusing belt.

4. The device as claimed in claim 2, wherein the heat absorption member includes a curved surface portion corresponding to a profile of the fusing belt.

5. The device as claimed in claim 2, wherein the heat absorption member is bent in multiple stages.

6. The device as claimed in claim 1, wherein the heat absorption member comprises:

a fixed part fixed to a peripheral structure; and a heat absorption part extending from the fixed part and having a predetermined length along a width direction of the fusing belt.

7. The device as claimed in claim 6, wherein an area of the heat absorption part is maintained at a first interval from the fusing belt.

8. The device as claimed in claim 7, wherein the heat absorption member further comprises an additional heat absorption part extending from the heat absorption part.

9. The device as claimed in claim 8, wherein an area of the additional heat absorption part is maintained at the first interval from the fusing belt.

10. The device as claimed in claim 8, wherein the additional heat absorption part has a predetermined length along a length direction of the fusing belt.

11. The device as claimed in claim 8, wherein the heat absorption part and the additional heat absorption part are at a right angle.

12. The device as claimed in claim 1, wherein the heat absorption member comprises aluminum.

13. An image forming apparatus comprising:

a main body;

a print engine in the main body and to form an image on a printing medium;

a fuser including a pressing roller and a fusing belt to face the pressing roller and to allow a heater to be included inside thereof; and a device to prevent fire of the fusing belt, the device including:

at least one temperature control member adjacent to one side of the fusing belt, and, when the at least one temperature control member detects abnormal heat from the fusing belt based on temperature of the fusing belt, the at least one temperature control member to cut off a supply of electricity to the heater to prevent the fire, and a heat absorption member to absorb latent heat from the fusing belt to lower the temperature of the fusing belt to prevent the fire, wherein the at least one temperature control member and the heat absorption member are at the same interval with respect to a n outer surface of the fusing belt, wherein the heat absorption member is located entirely on an opposite side of the temperature control member with respect to a center of the fusing belt in an axial direction of the fusing belt.

14. The image forming apparatus as claimed in claim 13, wherein the heat absorption member has a plate-like shape surrounding a portion of the other side of the fusing belt, and each of the at least one temperature control member and the heat absorption member is at the same interval with respect to the fusing belt.

* * * * *